(12) United States Patent
Sun et al.

(10) Patent No.: US 8,660,807 B2
(45) Date of Patent: Feb. 25, 2014

(54) METHOD OF SUBSTATION-CONTROL CENTER TWO-LEVEL DISTRIBUTED NONLINEAR STATE ESTIMATION FOR POWER SYSTEM

(75) Inventors: Hongbin Sun, Qinghuayuan (CN); Boming Zhang, Qinghuayuan (CN); Wenchuan Wu, Qinghuayuan (CN); Qinglai Guo, Qinghuayuan (CN); Qingxin Li, Qinghuayuan (CN)

(73) Assignee: Tsinghua University, Beijing (CN)

( * ) Notice: Subject to any disclaimer, the term of this patent is extended or adjusted under 35 U.S.C. 154(b) by 347 days.

(21) Appl. No.: 13/187,957

(22) Filed: Jul. 21, 2011

(65) Prior Publication Data
US 2012/0046889 A1 Feb. 23, 2012

(30) Foreign Application Priority Data
Jul. 23, 2010 (CN) .......................... 2010 1 0237485

(51) Int. Cl.
*G06F 19/00* (2011.01)
*G01R 21/00* (2006.01)
*H02J 3/00* (2006.01)
*H04L 12/66* (2006.01)

(52) U.S. Cl.
CPC . *H02J 3/00* (2013.01); *H04L 12/66* (2013.01); *H02J 2003/007* (2013.01); *Y02E 60/728* (2013.01); *Y04S 10/265* (2013.01)
USPC .................................. 702/61; 702/62; 702/64

(58) Field of Classification Search
CPC ........... H02J 3/00; H04L 12/66; Y02E 60/728
USPC ............ 702/60, 61, 62, 64, 65; 700/286, 292, 700/293
See application file for complete search history.

(56) References Cited

U.S. PATENT DOCUMENTS

| | | | |
|---|---|---|---|
| 7,494,271 B2 * | 2/2009 | Scholtz et al. | 374/45 |
| 2006/0224336 A1 * | 10/2006 | Petras et al. | 702/62 |
| 2006/0259255 A1 * | 11/2006 | Anderson et al. | 702/64 |
| 2012/0179301 A1 * | 7/2012 | Aivaliotis et al. | 700/286 |

* cited by examiner

*Primary Examiner* — John H Le
(74) *Attorney, Agent, or Firm* — Morgan, Lewis & Bockius LLP

(57) ABSTRACT

A substation-control center tow-level distributed grid nonlinear state estimation method is provided. RTU measurement data and PMU measurement data at each voltage level in each substation are collected. Performing a first three-phase state estimation is performed to obtain a first estimation result. Bad data from the RTU measurement data and the PMU measurement data are removed to estimate a state of a CB. A new CB island at each voltage level is formed, and a second three-phase state estimation for the new CB island is performed to obtain a final estimation result, in which the new CB island is a bus. The final estimation result is processed to obtain ripe data. And the ripe data, a part of the RTU measurement data and a part of the PMU measurement data are collected and a whole grid state estimation is performed.

11 Claims, 3 Drawing Sheets

METHOD OF SUBSTATION-CONTROL CENTER TWO-LEVEL DISTRIBUTED NONLINEAR STATE ESTIMATION FOR POWER SYSTEM

FIELD

The present disclosure relates to a power system operation and control field, and more particularly to a method of substation-control center two-level distributed nonlinear state estimation for power system.

BACKGROUND

An energy management system (hereinafter referred to as EMS) is a computer-based control automation system of a modern power system, an aim of which is to perform real-time collecting, monitoring, analyzing, optimization and control decisions for the power system. A power system state estimation is a foundation and a key issue of EMS, which eliminates error information using real-time measurement information collected from the power system and performs calculation to obtain a complete, consistent and reliable power system real-time variable so as to ensure an accuracy of an EMS control decision.

A conventional state estimation is implemented in a power control center, uses a remote terminal unit (hereinafter referred to as RTU) to collect analog and digital raw data, and sends the analog and digital raw data to the control center through a supervisory control and data acquisition system (hereinafter referred to as SCADA), thus completing the whole grid topology analysis and state estimation. Since information sent to the control center is not sufficient, an accuracy of control center automation basic data may not be satisfying by improving conventional state estimation model and algorithm, and an unavailability of a centralized state estimation resulted from topology errors, non-linear iteration divergence, big errors, etc. has become a bottleneck in a practicability of a worldwide control center advanced application. A fundamental reason for the above problem lies in irrational information distribution and processing. On the one hand, the information in the control center is centralized very much. An establishment of a whole grid model (comprising equipment parameters, static topology, and a single-line diagram) needs to be completed in the control center, and consequently a workload is significantly increasing with an increase of a grid size. Meanwhile, maintenance personnel in the control center may not be very familiar with every detail of the grid, a potential error may occur highly likely, and parameter errors or topology errors will be buried in large grid model information and may be difficult to remove. On the other hand, the information in a local control center may not be redundant enough. In order to avoid vast amounts of information transmission and storage, a part of information most concerned by the control center is usually sent by a substation, so that the control center may not obtain the redundant measurement information in the substation. Due to insufficient measurement redundancy, topology error and bad data detection and identification have become a difficult problem troubling the control center for many years. In addition, once the centralized control center suffers a disaster, paralysis of all the functions may be easily caused and may be difficult to heal.

A PMU (phasor measurement unit)-based substation-control center two-level distributed linear state estimation method is provided. Firstly a local linear state estimation is performed using PMU, and analog bad data and topology errors are identified simultaneously to obtain ripe data. Then, the ripe data are sent to the control center through a communication network to achieve a whole-grid linear state estimation. This method effectively improves a reliability of a whole-grid state estimation, particularly, a capability of the topology error detection. However, this method only uses the PMU measurements to perform a linear state estimation, and consequently it may apply only to a substation equipped with the PMU, but may not apply to a vast majority of substations without the PMU. Even for the substation equipped with the PMU, because RTU measurements are not used, the measurement redundancy and the ability to identify measurement errors may be reduced. At the same time, the network structure has been simplified, it is assumed that a system is running under a three-phase balance condition, a single-phase state estimation is performed in the substation and a result of the single-phase state estimation is sent to the control center, and the control center may not monitor a three-phase unbalance degree and a non-three-phase operating condition of the grid.

SUMMARY

The present disclosure is aimed to solve at least one of the above mentioned technical problems.

According to an aspect of the present disclosure, a substation-control center two-level distributed grid nonlinear state estimation method is provided, comprising steps of: A) collecting RTU measurement data and PMU measurement data at each voltage level in each substation by the control center; B) in each substation, performing a first three-phase state estimation according to the RTU measurement data and the PMU measurement data to obtain a first estimation result, and removing bad data from the RTU measurement data and the PMU measurement data according to the first estimation result to estimate a state of each CB by each substation; C) forming a new circuit-breaker (hereinafter referred to as CB) island at each voltage level according to the estimated state of the CBs, and performing a second three-phase state estimation for the new CB island to obtain a final estimation result by each substation, in which the new CB island is a bus here; D) processing the final estimation result to obtain ripe data by each substation; and E) collecting the ripe data and/or a part of the RTU measurement data and a part of the PMU measurement data and performing a whole grid state estimation according to the ripe data, a part of the RTU measurement data and a part of the PMU measurement data by the control center.

In one embodiment, the RTU measurement data comprise each three-phase voltage amplitude, each three-phase current amplitude, each three-phase active power and each three-phase reactive power in the substation and a measured state of each phase of each CB in the substation; and the PMU measurement data comprise each three-phase complex voltage, each three-phase complex current, each three-phase active power and each three-phase reactive power in the substation.

In one embodiment, the final estimation result comprises: a three-phase state of the CB, a three-phase active power and a three-phase reactive power of each CB in the new CB island at each voltage level; and a three-phase complex voltage, a three-phase injection active power and a three-phase injection reactive power of each node in the new CB island at each voltage level.

In one embodiment, the ripe data comprise: a three-phase voltage unbalance degree of each bus in the substation, a three-phase current unbalance degree of each outlet node, a total three-phase injection active power and a total three-phase injection reactive power of each outlet node, a total three-phase state of each CB, a line voltage or a positive sequence voltage of each bus, and a single-phase current or a positive sequence current of each outlet node.

In one embodiment, the line voltage and the positive sequence voltage of each bus and the three-phase voltage unbalance degree of each bus in the substation are obtained through steps of:

obtaining a three-phase complex voltage of each bus in each new CB island in the substation according to the three-phase complex voltage measurement of each node by a following formula:

$$\dot{U}_{BSm}^{\varphi} = \frac{\sum_{i=1}^{n} U_{nd,i}^{\varphi}}{n}$$

in which $U_{nd,i}^{\phi}$ is a three-phase complex voltage measurement of an $i^{th}$ node, $\phi=a,b,c$ represents three phases, $\dot{U}_{BSm}^{\phi}$ is a three-phase complex voltage of a bus of a $m^{th}$ new CB island, and n is the number of the bus;

obtaining the line voltage of each bus according to the three-phase complex voltage of each bus by following formulae:

$$\begin{cases} \dot{U}_{BSm}^{ab} = \dot{U}_{BSm}^{a} - \dot{U}_{BSm}^{b} \\ \dot{U}_{BSm}^{ac} = \dot{U}_{BSm}^{a} - \dot{U}_{BSm}^{c} \\ \dot{U}_{BSm}^{bc} = \dot{U}_{BSm}^{b} - \dot{U}_{BSm}^{c} \end{cases}$$

in which $\dot{U}_{BSm}^{ab}$ is an a-b line voltage of a $m^{th}$ bus, $\dot{U}_{BSm}^{ac}$ is an a-c line voltage of the $m^{th}$ bus, and $\dot{U}_{BSm}^{bc}$ is a b-c line voltage of the $m^{th}$ bus;

obtaining the positive sequence voltage and a negative sequence voltage of each bus according to the three-phase complex voltage of each bus by following formulae:

$$\begin{cases} \dot{U}_{BSm}^{(1)} = \frac{1}{3}(\dot{U}_{BSm}^{a} + \alpha \dot{U}_{BSm}^{b} + \alpha^2 \dot{U}_{BSm}^{c}) \\ \dot{U}_{BSm}^{(2)} = \frac{1}{3}(\dot{U}_{BSm}^{a} + \alpha^2 \dot{U}_{BSm}^{b} + \alpha \dot{U}_{BSm}^{c}) \end{cases}$$

in which $$\alpha = e^{j\frac{2}{3}\pi} = -\frac{1}{2} + j\frac{\sqrt{3}}{2},$$

$\dot{U}_{BSm}^{(1)}$ is a positive sequence voltage of the $m^{th}$ bus, and $\dot{U}_{BSm}^{(2)}$ is a negative sequence voltage of the $m^{th}$ bus; and obtaining the three-phase voltage unbalance degree of each bus in the substation according to the positive sequence voltage and the negative sequence voltage of each bus by following formulae:

$$\varepsilon_{U_{BSm}} = \frac{|U_{Bsm}^{(2)}|}{|U_{Bsm}^{(1)}|} \times 100\%$$

-continued $$\begin{cases} |U_{Bsm}^{(1)}| = \sqrt{(U_{Bsm,real}^{(1)})^2 + (U_{Bsm,imag}^{(1)})^2} \\ |U_{Bsm}^{(2)}| = \sqrt{(U_{Bsm,real}^{(2)})^2 + (U_{Bsm,imag}^{(2)})^2} \end{cases}$$

in which $U_{BSm,real}^{(1)}$ and $U_{BSm,imag}^{(1)}$ are a real part and an imaginary part of the positive sequence voltage $\dot{U}_{BSm}^{(1)}$ of the $m^{th}$ bus respectively, $U_{BSm,real}^{(2)}$ and $U_{BSm,imag}^{(2)}$ are a real part and an imaginary part of the negative sequence voltage $\dot{U}_{BSm}^{(2)}$ of the $m^{th}$ bus respectively, $|U_{BSm}^{(1)}|$ and $|U_{BSm}^{(2)}|$ are amplitudes of the positive sequence voltage and the negative sequence voltage of the $m^{th}$ bus respectively, and $\epsilon_{U_{BSm}}$ is a three-phase voltage unbalance degree of the $m^{th}$ bus.

In one embodiment, the positive sequence current, the single phase current and the three-phase current unbalance degree of each outlet node are obtained through steps of:

obtaining the three-phase injection complex current of each outlet node in each new CB island according to the three-phase complex voltage of each new CB island and the three-phase injection active power and the reactive power of each outlet node by a following formula:

$$\dot{I}_{LN,m_j}^{\varphi} = \left(\frac{P_{LN,m_j}^{\varphi} + jQ_{LN,m_j}^{\varphi}}{\dot{U}_{BSm}^{\varphi}}\right)^{*}$$

in which $P_{LN,m_j}^{\phi}$ is a three-phase injection active power of a $j^{th}$ outlet node in a $m^{th}$ new CB island, $Q_{LN,m_j}^{\phi}$ is a three-phase injection reactive power of the $j^{th}$ outlet node in the $m^{th}$ new CB island, $\dot{I}_{LN,m_j}^{\phi}$ is a three-phase complex current of the $j^{th}$ outlet node in the $m^{th}$ new CB island, and $\phi=a,b,c$ represents three phases;

obtaining the positive sequence current and a negative sequence current of each outlet node according to the three-phase complex current of each outlet node by following formulae:

$$\begin{cases} \dot{I}_{LN,m_j}^{(1)} = \frac{1}{3}(\dot{I}_{LN,m_j}^{a} + \alpha \dot{I}_{LN,m_j}^{b} + \alpha^2 \dot{I}_{LN,m_j}^{c}) \\ \dot{I}_{LN,m_j}^{(2)} = \frac{1}{3}(\dot{I}_{LN,m_j}^{a} + \alpha^2 \dot{I}_{LN,m_j}^{b} + \alpha \dot{I}_{LN,m_j}^{c}) \end{cases}$$

in which $$\alpha = e^{j\frac{2}{3}\pi} = -\frac{1}{2} + j\frac{\sqrt{3}}{2},$$

$\dot{I}_{LN,m_j}^{(1)}$ is a positive sequence current of a $j^{th}$ outlet node of a $m^{th}$ bus, and $\dot{I}_{LN,m_j}^{(2)}$ is a negative sequence current of the $j^{th}$ outlet node of the $m^{th}$ bus; and obtaining the three-phase current unbalance degree of each outlet node in the substation according to the positive sequence current and the negative sequence current of each outlet node by following formulae:

$$\varepsilon_{I_{LN,m_j}} = \frac{|I_{LN,m_j}^{(2)}|}{\|I_{LN,m_j}^{(1)}\|} \times 100\%$$

-continued $$\begin{cases} |I_{LN,m_j}^{(1)}| = \sqrt{(I_{LN,m_j,real}^{(1)})^2 + (I_{LN,m_j,imag}^{(1)})^2} \\ |I_{LN,m_j}^{(2)}| = \sqrt{(I_{LN,m_j,real}^{(2)})^2 + (I_{LN,m_j,imag}^{(2)})^2} \end{cases}$$

in which $I_{LN,m_j,real}^{(1)}$ and $I_{LN,m_j,imag}^{(1)}$ are a real part and an imaginary part of the positive sequence current of the $j^{th}$ outlet node in the $m^{th}$ new CB island respectively, $I_{LN,m_j,real}^{(2)}$ and $I_{LN,m_j,imag}^{(2)}$ are a real part and an imaginary part of the negative sequence current of the $j^{th}$ outlet node in the $m^{th}$ new CB island respectively, $|I_{LN,m_j}^{(1)}|$ and $|I_{LN,m_j}^{(2)}|$ are amplitudes of the positive sequence current and the negative sequence current of the $j^{th}$ outlet node in the $m^{th}$ new CB island respectively, and $$\varepsilon_{I_{LN,m_j}}$$

is a three-phase current unbalance degree of the $j^{th}$ outlet node in the $m^{th}$ new CB island.

In one embodiment, the total three-phase state of each CB in the substation is obtained according to the three-phase state of each CB by a following formula:

$$S_{CB,i}^3 = \begin{cases} 0, \text{ if } S_{CB,i}^a = S_{CB,i}^b = S_{CB,i}^c = 0; \\ 1, \text{ if } S_{CB,i}^a = S_{CB,i}^b = S_{CB,i}^c = 1; \\ 2, \text{ not conform} \end{cases}$$

in which $S_{CB,i}^\phi$ is a three-phase state of an $i^{th}$ CB, $\phi=a,b,c$ represents three phases, and $S_{CB,i}^3$ is a total three-phase state of the $i^{th}$ CB.

In one embodiment, the total three-phase injection active power and the total three-phase injection reactive power of each outlet node in the substation are obtained according to the three-phase injection active power and the three-phase injection reactive power of each outlet node by following formulae:

$$\begin{cases} P_{LN,j}^3 = P_{LN,j}^a + P_{LN,j}^b + P_{LN,j}^c \\ Q_{LN,j}^3 = Q_{LN,j}^a + Q_{LN,j}^b + Q_{LN,j}^c, \end{cases}$$

in which $P_{LN,j}^\phi$ is a three-phase injection active power of a $j^{th}$ outlet node, $Q_{LN,j}^\phi$ is a three-phase injection reactive power of the $j^{th}$ outlet node, $\phi=a,b,c$ represents three phases, $P_{LN,j}^3$ is a total three-phase injection active power of the $j^{th}$ outlet node, and $Q_{LN,j}^3$ is a total three-phase injection reactive power of the $j^{th}$ outlet node.

In one embodiment, the step E) further comprises:
for the substations performing the substation three-phase state estimation, the control center collecting the measurement ripe data of each transformer substation; and
for the substations not performing the substation three-phase state estimation, the control center collecting a part of the RTU measurement data and a part of the PMU measurement data.

In one embodiment, the part of the RTU measurement data comprises a line voltage or a positive sequence voltage of each electric bus, a single-phase current or a positive sequence current of each outlet node, a total three-phase active power of each outlet node, a total three-phase reactive power of each outlet node and a total three-phase state of each CB; and the part of the PMU measurement data comprises a line voltage or a positive sequence voltage of each electric bus, a single-phase current or a positive sequence current of each outlet node, a total three-phase active power of each outlet node and a total three-phase reactive power of each outlet node, in which the outlet node is connected with a transformer, an alternating current line or a reactive compensator in the substation.

In one embodiment, the step E) further comprises:
when the total three-phase state of the CB is 2, alarming;
when the three-phase current unbalance degree of each outlet node in the substation is larger than a predetermined current unbalance degree threshold, alarming; or
when the three-phase voltage unbalance degree of each bus in the substation is larger than a predetermined voltage unbalance degree threshold, alarming.

In one embodiment, a period of the control center state estimation is larger than that of the substation state estimation.

Compared with a conventional control center centralized state estimation method, the method of substation-control center two-level distributed nonlinear state estimation for power system according to an embodiment of the present disclosure may have at least one of the following advantages.

1. Because a measurement redundancy (comprising the PMU measurement data and the RTU measurement data) in the substation is high, and an acquisition speed is high, so that a reliability of the state estimation is high and an accuracy of the state estimation is high, especially three-phase measurement information on a CB in the substation is rich, a topology error detection capability is strong, and topology errors may be significantly reduced.

2. Because a network size in the substation is small, so that a calculation speed is fast and may be realized in real time.

3. After the state estimation, the prefiltered ripe data are sent to the control center, thus significantly reducing topology errors and analog bad data in the whole grid and improving the reliability and the accuracy of the control center state estimation.

4. The three-phase state estimation provides the control center with a three-phase unbalance degree and non-three-phase operation information of each substation, thus improving a capability of the control center to monitor the three-phase unbalance degree and the non-three-phase operating condition of the whole grid reliably.

5. A transition from the conventional centralized state estimation to the two-level distributed state estimation is achieved.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION OF EMBODIMENTS OF THE DISCLOSURE

Figure 1:
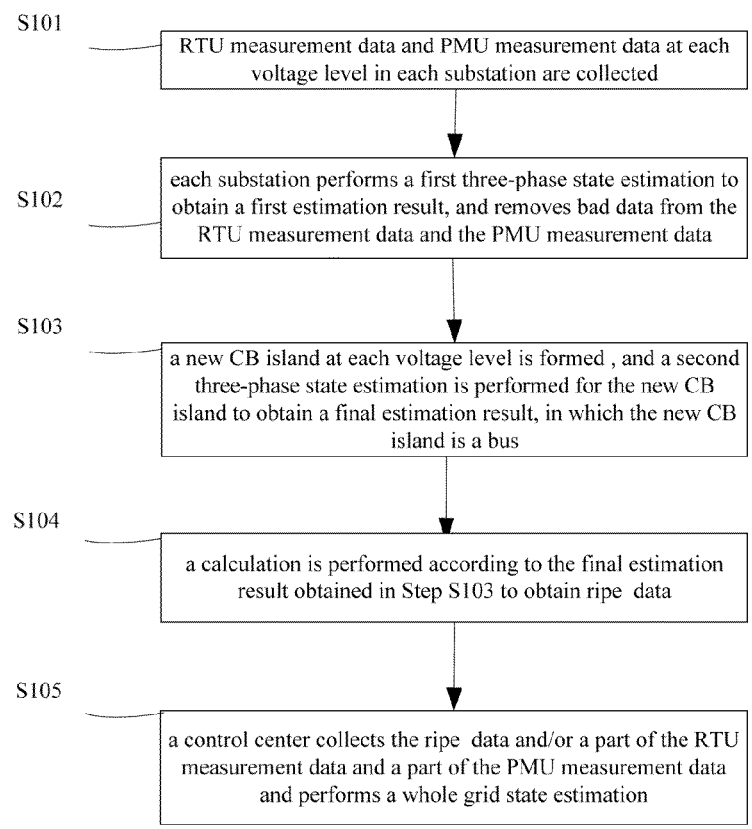
FIG. 1 is a flow chart of a method of substation-control center two-level distributed nonlinear state estimation for power system according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

As shown in FIG. 1, the method of substation-control center two-level distributed nonlinear state estimation for power system according to an embodiment of the present disclosure comprises the following steps.

Step S101, RTU measurement data and PMU measurement data at each voltage level in each substation are collected.

In one embodiment, the RTU measurement data comprise each three-phase voltage amplitude, each three-phase current amplitude, each three-phase active power and each three-phase reactive power in the substation and a state of each phase of each CB in the substation; and the PMU measurement data comprise each three-phase complex voltage, each three-phase complex current, each three-phase active power and each three-phase reactive power in the substation.

Step S102, each substation performs a first three-phase state estimation according to the RTU measurement data and the PMU measurement data to obtain a first estimation result, and removes bad data from the RTU measurement data and the PMU measurement data according to the first estimation result to estimate a state of a CB.

Particularly, if all the three phases of each CB at each voltage level in each substation are closed, a CB island consisting of connected zero-impedance CB branches is formed, a zero-impedance voltage state estimation and a zero-impedance power state estimation are performed in each CB island respectively, an identification of analog bad data is performed according to a result of the zero-impedance power state estimation to remove bad data, and a state of a CB is estimated according to analog data from which the bad data has been removed. Detailed working process may be substantially the same as a conventional process, so detailed description thereof is omitted here for brevity.

Step S103, a new CB island at each voltage level is formed according to the estimated state of the CB, and a second three-phase state estimation is performed for the new CB island to obtain a final estimation result, in which the new CB island is a bus.

The new CB island at each voltage level is formed according to the estimated state of the CB. If there are M new CB islands, then $$M = \sum_{k=1}^{K} N_k,$$

in which K is a number of the voltage levels in the transformer substation, and $N_k$ is a number of CB islands at a $k^{th}$ voltage level.

The three-phase state estimation is performed for each new CB island to obtain the final estimation result. The final estimation result comprises: a three-phase CB state $S_{CB}^{\Phi}$, a three-phase active power $P_{CB}^{\Phi}$ and a three-phase reactive power $Q_{CB}^{\Phi}$ of each CB in the new CB island at each voltage level; and a three-phase complex voltage $\dot{U}_{nd}^{\Phi}$, a three-phase injection active power $$P_{ND}^{\varphi} = \begin{pmatrix} P_{LN}^{\varphi} \\ P_{nd,i}^{\varphi} \end{pmatrix}$$

and a three-phase injection reactive power $$Q_{ND}^{\varphi} = \begin{pmatrix} Q_{LN}^{\varphi} \\ Q_{nd}^{\varphi} \end{pmatrix}$$

of each node in the new CB island at each voltage level, in which $P_{LN}^{\Phi}$ and $Q_{LN}^{\Phi}$ are a three-phase injection active power and a three-phase injection reactive power of an outlet node connected with a transformer, a alternating current line or a reactive compensator in the substation respectively, $P_{nd}^{\Phi}$ and $Q_{nd}^{\Phi}$ are a three-phase injection active power and a three-phase injection reactive power of any physical node except the outlet node respectively, and a superscript $\phi$=a,b,c represents three phases.

Step S104, a calculation is performed according to the final estimation result obtained in Step S103 to obtain ripe data.

The ripe data may comprise: a three-phase voltage unbalance degree of each bus in the substation, a three-phase current unbalance degree of each outlet node, a total three-phase injection active power and a total three-phase injection reactive power of each outlet node, a total three-phase state of each CB, a line voltage or a positive sequence voltage of each bus, and a single-phase current or a positive sequence current of each outlet node.

Hereinafter, a particular calculation process of the above measurement data will be described in detail.

1. Calculation of the line voltage, the positive sequence voltage and the three-phase voltage unbalance degree of each bus.

First, a three-phase complex voltage of each bus in each new CB island in the substation is obtained according to the three-phase complex voltage measurement of each node by a following formula, taking a $m^{th}$ CB island as an example:

$$\dot{U}_{BSm}^{\varphi} = \frac{\sum_{i=1}^{n} \dot{U}_{nd,i}^{\varphi}}{n}$$

in which $U_{nd,i}^{\Phi}$ is a three-phase complex voltage of an $i^{th}$ node, $\phi$=a,b,c represents three phases, $\dot{U}_{BSm}^{\Phi}$ is a three-phase complex voltage of a bus of a $m^{th}$ new CB island, and n is a number of the bus.

Therefore, the line voltage of each bus is obtained by following formulae:

$$\begin{cases} \dot{U}_{BSm}^{ab} = \dot{U}_{BSm}^{a} - \dot{U}_{BSm}^{b} \\ \dot{U}_{BSm}^{ac} = \dot{U}_{BSm}^{a} - \dot{U}_{BSm}^{c} \\ \dot{U}_{BSm}^{bc} = \dot{U}_{BSm}^{b} - \dot{U}_{BSm}^{c} \end{cases}$$

in which $\dot{U}_{BSm}^{ab}$ is an a-b line voltage of a $m^{th}$ bus, $\dot{U}_{BSm}^{ac}$ is an a-c line voltage of the $m^{th}$ bus, and $\dot{U}_{BSm}^{bc}$ is a b-c line voltage of the $m^{th}$ bus.

Then, the positive sequence voltage and a negative sequence voltage of each bus are obtained according to the three-phase complex voltage of each bus by following formulae:

$$\begin{cases} \dot{U}_{BSm}^{(1)} = \frac{1}{3}(\dot{U}_{BSm}^{a} + \alpha \dot{U}_{BSm}^{b} + \alpha^2 \dot{U}_{BSm}^{c}) \\ \dot{U}_{BSm}^{(2)} = \frac{1}{3}(\dot{U}_{BSm}^{a} + \alpha^2 \dot{U}_{BSm}^{b} + \alpha \dot{U}_{BSm}^{c}) \end{cases}$$

in which $$\alpha = e^{j\frac{2}{3}\pi} = -\frac{1}{2} + j\frac{\sqrt{3}}{2},$$

$\dot{U}_{BSm}^{(1)}$ is a positive sequence voltage of the $m^{th}$ bus, and $\dot{U}_{BSm}^{(2)}$ is a negative sequence voltage of the $m^{th}$ bus.

Next, amplitudes of the positive sequence voltage and the negative sequence voltage of each bus in the substation are obtained according to the positive sequence voltage and the negative sequence voltage of each bus by following formulae:

$$\begin{cases} |U_{Bsm}^{(1)}| = \sqrt{(U_{Bsm,real}^{(1)})^2 + (U_{Bsm,imag}^{(1)})^2} \\ |U_{Bsm}^{(2)}| = \sqrt{(U_{Bsm,real}^{(2)})^2 + (U_{Bsm,imag}^{(2)})^2} \end{cases}$$

in which $U_{Bsm,real}^{(1)}$ and $U_{Bsm,imag}^{(1)}$ are a real part and an imaginary part of the positive sequence voltage $\dot{U}_{BSm}^{(1)}$ of the $m^{th}$ bus respectively, $U_{Bsm,real}^{(2)}$ and $U_{Bsm,imag}^{(2)}$ are a real part and an imaginary part of the negative sequence voltage $\dot{U}_{BSm}^{(2)}$ of the $m^{th}$ bus respectively, and $|U_{Bsm}^{(1)}|$ and $|U_{Bsm}^{(2)}|$ are amplitudes of the positive sequence voltage and the negative sequence voltage of the $m^{th}$ bus respectively.

Finally, the three-phase voltage unbalance degree of each bus in the substation is obtained according to amplitudes of the positive sequence voltage and the negative sequence voltage of each bus by a following formula:

$$\varepsilon_{U_{BSm}} = \frac{|U_{Bsm}^{(2)}|}{|U_{Bsm}^{(1)}|} \times 100\%$$

in which $\varepsilon_{U_{BSm}}$ is a three-phase voltage unbalance degree of the $m^{th}$ bus.

2. Calculation of the single phase current, the positive sequence current and the three-phase current unbalance degree of each outlet node.

First, the three-phase injection complex current of each outlet node in each new CB island is obtained according to the three-phase complex voltage of each new CB island and the three-phase injection active power and the reactive power of each outlet node by a following formula, taking a $m^{th}$ new CB island as an example:

$$\dot{I}_{LN,m_j}^{\phi} = \left(\frac{P_{LN,m_j}^{\phi} + jQ_{LN,m_j}^{\phi}}{\dot{U}_{BSm}^{\phi}}\right)^*$$

in which $P_{LN,m_j}^{\phi}$ is a three-phase injection active power of a $j^{th}$ outlet node in a $m^{th}$ new CB island, $Q_{LN,m_j}^{\phi}$ is a three-phase injection reactive power of the $j^{th}$ outlet node in the $m^{th}$ new CB island, $\dot{I}_{LN,m_j}^{\phi}$ is a three-phase complex current of the $j^{th}$ outlet node in the $m^{th}$ new CB island, and $\phi=a,b,c$ represents three phases.

Next, the positive sequence current and a negative sequence current of each outlet node are obtained according to the three-phase complex current of each outlet node by following formulae:

$$\begin{cases} \dot{I}_{LN,m_j}^{(1)} = \frac{1}{3}(\dot{I}_{LN,m_j}^{a} + \alpha \dot{I}_{LN,m_j}^{b} + \alpha^2 \dot{I}_{LN,m_j}^{c}) \\ \dot{I}_{LN,m_j}^{(2)} = \frac{1}{3}(\dot{I}_{LN,m_j}^{a} + \alpha^2 \dot{I}_{LN,m_j}^{b} + \alpha \dot{I}_{LN,m_j}^{c}) \end{cases}$$

in which $$\alpha = e^{j\frac{2}{3}\pi} = -\frac{1}{2} + j\frac{\sqrt{3}}{2},$$

$\dot{I}_{LN,m_j}^{(1)}$ is a positive sequence current of a $j^{th}$ outlet node of a $m^{th}$ bus, and $\dot{I}_{LN,m_j}^{(2)}$ is a negative sequence current of the $j^{th}$ outlet node of the $m^{th}$ bus.

Then, amplitudes of the positive sequence current and the negative sequence current of each outlet node are obtained according to the positive sequence current and the negative sequence current of each outlet node by following formulae:

$$\begin{cases} |I_{LN,m_j}^{(1)}| = \sqrt{(I_{LN,m_j,real}^{(1)})^2 + (I_{LN,m_j,imag}^{(1)})^2} \\ |I_{LN,m_j}^{(2)}| = \sqrt{(I_{LN,m_j,real}^{(2)})^2 + (I_{LN,m_j,imag}^{(2)})^2} \end{cases}$$

in which $I_{LN,m_j,real}^{(1)}$ and $I_{LN,m_j,imag}^{(1)}$ are a real part and an imaginary part of the positive sequence current of the $j^{th}$ outlet node in the $m^{th}$ new CB island respectively, $I_{LN,m_j,real}^{(2)}$ and $I_{LN,m_j,imag}^{(2)}$ are a real part and an imaginary part of the negative sequence current of the $j^{th}$ outlet node in the $m^{th}$ new CB island respectively, and $|I_{LN,m_j}^{(1)}|$ and $|I_{LN,m_j}^{(2)}|$ are amplitudes of the positive sequence current and the negative sequence current of the $j^{th}$ outlet node in the $m^{th}$ new CB island respectively.

Finally, the three-phase current unbalance degree of each outlet node in the substation is obtain according to amplitudes of the positive sequence current and the negative sequence current of each outlet node by a following formula:

$$\varepsilon_{I_{LN,m_j}} = \frac{|I_{LN,m_j}^{(2)}|}{|I_{LN,m_j}^{(1)}|} \times 100\%$$

in which $\varepsilon_{I_{LN,m_j}}$ is a three-phase current unbalance degree of the $j^{th}$ outlet node in the $m^{th}$ new CB island.

3. Calculation of the total three-phase state of each CB.

The total three-phase state of each CB in the substation is obtained according to the three-phase state of each CB by a following formula:

$$S_{CB,i}^3 = \begin{cases} 0, \text{ if } S_{CB,i}^a = S_{CB,i}^b = S_{CB,i}^c = 0; \\ 1, \text{ if } S_{CB,i}^a = S_{CB,i}^b = S_{CB,i}^c = 1; \\ 2, \text{ not conform} \end{cases}$$

in which $S_{CB,i}^\phi$ is a three-phase state of an $i^{th}$ CB, $\phi=a,b,c$ represents three phases, and $S_{CB,i}^3$ is a total three-phase state of the $i^{th}$ CB.

4. Calculation of the total three-phase injection active power and the total three-phase injection reactive power of each outlet node The total three-phase injection active power and the total three-phase injection reactive power of each outlet node in the substation are obtained according to the three-phase injection active power and the three-phase injection reactive power of each outlet node by following formulae:

$$\begin{cases} P_{LN,j}^3 = P_{LN,j}^a + P_{LN,j}^b + P_{LN,j}^c \\ Q_{LN,j}^3 = Q_{LN,j}^a + Q_{LN,j}^b + Q_{LN,j}^c \end{cases}$$

in which $P_{LN,j}^\phi$ is a three-phase injection active power of a $j^{th}$ outlet node, $Q_{LN,j}^\phi$ is a three-phase injection reactive power of the $j^{th}$ outlet node, $\phi=a,b,c$ represents three phases, $P_{LN,j}^3$ is a total three-phase injection active power of the $j^{th}$ outlet node, and $Q_{LN,j}^3$ is a total three-phase injection reactive power of the $j^{th}$ outlet node.

Step S105, a control center collects the ripe data and/or a part of the RTU measurement data and a part of the PMU measurement data and performs a whole grid state estimation according to the ripe data, a part of the RTU measurement data and a part of the PMU measurement data.

Particularly, for the substations performing the substation three-phase state estimation, when the control center needs positive sequence ripe data to perform the state estimation for a grid, the ripe data collected by the control center comprise a positive sequence voltage of each bus, a positive sequence current of each outlet node, a total three-phase active power and a total three-phase reactive power of each outlet node, a three-phase voltage unbalance degree of each bus, a three-phase current unbalance degree of each outlet node and a total three-phase state of each CB; and when the control center needs single-phase ripe data to perform the state estimation for the grid, the ripe data collected by the control center may comprise a line voltage of each bus, a single-phase current of each outlet node, a total three-phase active power and a total three-phase reactive power of each outlet node, a three-phase voltage unbalance degree of each bus, a three-phase current unbalance degree of each outlet node and a total three-phase state of each CB.

In addition, for the substations not performing the substation three-phase state estimation, a part of original measurement data are sent to the control center. Particularly, when the control center needs positive sequence ripe data to perform the state estimation for the grid, the original measurement data collected by the control center comprise a voltage amplitude of each electric bus in the substation collected by RTU, a current amplitude of each outlet node collected by RTU, a total three-phase active power and a total three-phase reactive power of each outlet node collected by RTU, a positive sequence complex voltage of each electric bus collected by PMU, a positive sequence complex current of each outlet node collected by PMU, a total three-phase active power and a total three-phase reactive power of each outlet node collected by PMU, and a total three-phase state of each CB; and when the controlcenter needs single-phase ripe data to perform the state estimation for the grid, the original measurement data collected by the control center comprise an a, b line voltage amplitude of each electric bus in the substation collected by RTU, an a phase current amplitude of each outlet node in the substation collected by RTU, a total three-phase active power and a total three-phase reactive power of each outlet node collected by RTU, an a, b line complex voltage of each electric bus in the substation collected by PMU, an a phase complex current of each outlet node collected by PMU, a total three-phase active power and a total three-phase reactive power of each outlet node collected by PMU, and a total three-phase state of each CB.

Under any of the following conditions, the power system alarms: 1) when the total three-phase state $z_{CBi}$ of the i CB is 2, i.e., a non-three-phase operating condition; 2) when the three-phase complex current unbalance degree $\epsilon_{I_{LN}}$ of each outlet node in the substation is larger than a predetermined current unbalance degree threshold; and 3) when the three-phase voltage unbalance degree $\epsilon_{U_{BS}}$ of each bus in the substation is larger than a predetermined voltage unbalance degree threshold.

In addition, the control center may perform conventional power system topology analysis and state estimation for the grid using a state estimation result of each substation. A conventional state estimation objective function is as follows:

$$J(x)=[z-h(x)]^T R^{-1}[z-h(x)]$$

in which $x=(v_1, \ldots v_m, \theta_1, \ldots, \theta_m)^T$ represents a voltage amplitude and a phase angle of each bus in the grid, and a measurement vector $$z = \begin{pmatrix} z_{se} \\ z_{meas} \end{pmatrix}$$

comprises measurement ripe data $z_{se}$ obtained by the substation state estimation for which the state estimation is performed and original measurement data $z_{meas}$ of the substation for which the state estimation is not performed. Detailed process may be substantially the same as a conventional process, so detailed description thereof is omitted here for brevity.

All the above steps are repeated periodically to perform the substation-control center two-level distributed grid non-linear state estimation. It should be noted that a period of the control center state estimation is larger than that of the substation state estimation. For example, the substation state estimation period is 1 s, and the control center state estimation period is 5 s.

Hereinafter, the method according to an embodiment of the present disclosure will be further described by examples.

Figure 2:
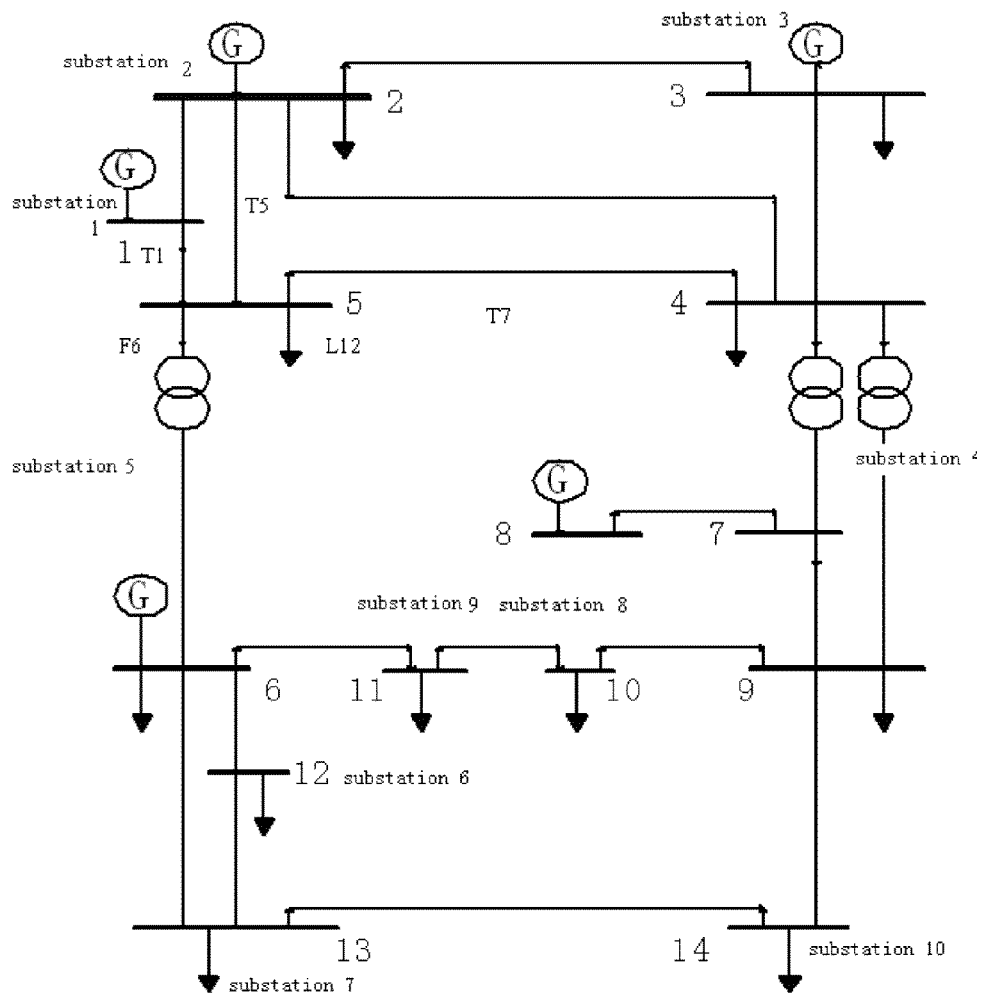
FIG. 2 is a diagram of an IEEE 14 node model according to an embodiment of the present disclosure.
Figure 3:
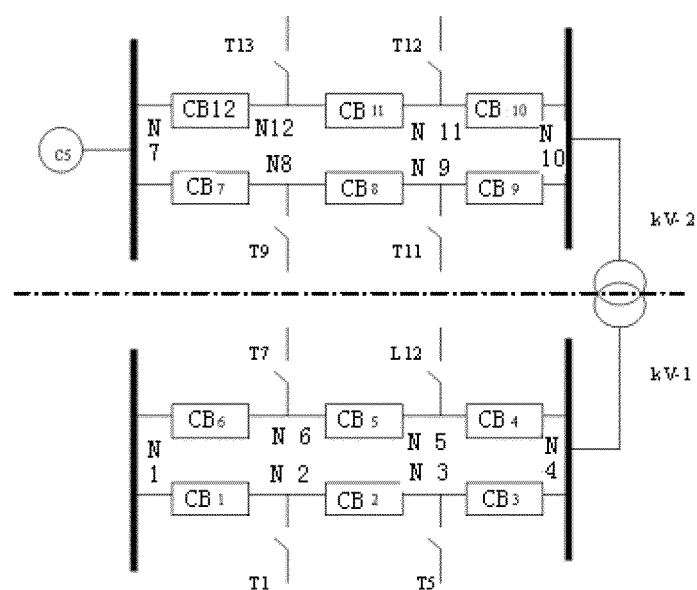
FIG. 3 is a diagram of a circuit breaker-node model of a substation according to an embodiment of the present disclosure.

FIG. 2 is a diagram of an IEEE14 node model according to an embodiment of the present disclosure. In this model, all the buses connected by a transformer are disposed in the same substation. In FIG. 2, a bus 5 and a bus 6 constitute a substation 5, a bus 4 and a bus 9 constitute a transformer substation 4, each of the remaining buses is a substation, and a CBoriented three-phase model is established for each substation. A circuit breaker-node model of the substation 5 constituted by the bus 5 and the bus 6 is shown in FIG. 3.

In this embodiment, a power flow calculation result is used as a true value to perform the state estimation for the system. Meanwhile, in order to simulate real-time system measurement, Gauss noise is added to the measurement true value to cause a difference of a three-phase measurement value. Here, it is assumed that there is only power and current amplitude measurement data from RTU on each CB and node in the substation. In a practical substation, there may be several groups of multi-source measurement data with different accuracy from different measurement devices such as PMU and RTU, so that a measurement redundancy will be larger.

1) Experiment 1: There are Only Analog Bad Data.

For a conventional state estimation algorithm, the state estimation is not performed for the substation, and only the total three-phase active power measurement data and the total three-phase reactive power measurement data are directly sent to the control center. The control center may only establish a single-phase model of the whole system to perform the single-phase state estimation, but may not perform an identification for bad data of A, B, and C phases. When a two-level distributed state estimation algorithm is used, bad data of each phase may be effectively removed by the three-phase state estimation to prefilter the measurement data.

In the substation shown in FIG. 3, it is assumed that all the circuit breakers (hereinafter shown as CB) in all the substations are closed and there are no bad data in the state of the CB. It is assumed that the total three-phase active power measurement data and the total three-phase reactive power measurement data of alternate current lines T1, T5, and T7 (i.e., branches 1-5, 2-5, and 4-5 in FIG. 2) are bad data. On the line T1, the A-phase active power measurement data and the A-phase reactive power measurement data are bad data, and there are no bad data in B and C phases; on the line T5, the B-phase active power measurement data and the B-phase reactive power measurement data are bad data, and there are no bad data in A and C phases; and on the line T7, the C-phase active power measurement data and the C-phase reactive power measurement data are bad data, and there are no bad data in A and B phases. The remaining measurement data are not bad data. By the state estimation, the active power measurement data and the reactive power measurement data on the lines T1, T5, and T7 have been removed at the substation level, which may not influence a reliability of a whole-grid state estimation in the control center.

The voltage amplitude and angle estimation result of each bus are shown in Table 1. When the two-level distributed state estimation method is used, firstly, the three-phase state estimation is performed using highly redundant data in the substation to remove power bad data on the A phase of the line T1, the B phase of the line T5, and the C phase of the line T7 respectively, then a correct total three-phase power estimation value is sent to the control center to perform the state estimation, thus obtaining an estimation result with high accuracy.

TABLE 1

Comparison of Voltage Estimation Results of Buses When There Are Only Analog Bad Data

|   | True Value | | Two-level State Estimation Value | | Measurement Estimation Error | |
|---|---|---|---|---|---|---|
| Bus | V (p.u.) | Ang (rad) | V (p.u.) | Ang (rad) | V (p.u.) | Ang (rad) |
| 1 | 1.060 | 0.000 | 1.063 | 0.000 | 0.00347 | 0.00000 |
| 2 | 1.045 | −0.087 | 1.049 | −0.086 | 0.00350 | 0.00066 |

TABLE 1-continued

Comparison of Voltage Estimation Results of Buses When There Are Only Analog Bad Data

|   | True Value | | Two-level State Estimation Value | | Measurement Estimation Error | |
|---|---|---|---|---|---|---|
| Bus | V (p.u.) | Ang (rad) | V (p.u.) | Ang (rad) | V (p.u.) | Ang (rad) |
| 3 | 1.010 | −0.222 | 1.013 | −0.220 | 0.00276 | 0.00172 |
| 4 | 1.019 | −0.180 | 1.022 | −0.178 | 0.00370 | 0.00179 |
| 5 | 1.020 | −0.153 | 1.024 | −0.152 | 0.00348 | 0.00177 |
| 6 | 1.070 | −0.248 | 1.075 | −0.246 | 0.00492 | 0.00226 |
| 7 | 1.062 | −0.233 | 1.066 | −0.230 | 0.00447 | 0.00304 |
| 8 | 1.090 | −0.233 | 1.095 | −0.230 | 0.00463 | 0.00377 |
| 9 | 1.056 | −0.261 | 1.061 | −0.258 | 0.00468 | 0.00324 |
| 10 | 1.051 | −0.264 | 1.056 | −0.260 | 0.00499 | 0.00319 |
| 11 | 1.057 | −0.258 | 1.063 | −0.256 | 0.00551 | 0.00267 |
| 12 | 1.055 | −0.263 | 1.060 | −0.262 | 0.00481 | 0.00088 |
| 13 | 1.050 | −0.265 | 1.056 | −0.262 | 0.00514 | 0.00211 |
| 14 | 1.036 | −0.280 | 1.039 | −0.276 | 0.00290 | 0.00407 |

2) Experiment 2: One State Measurement Data of the CB in the Substation are Bad Data.

In the substation 5 constituted by the bus 5 and the bus 6 (see FIG. 3), it is assumed that correct states of a CB 1 and a CB 6 are open, states of other CBs are closed, and power measurement data and state measurement data on a CB 3 are bad data, that is, the state measurement of the CB 3 is open. If these bad data are directly sent to the control center, then a wrong CB state will result in wrong topology analysis, that is, a CB 2 is a CB island and a CB 4 and a CB 5 constitutes another CB island. In other words, the bus 5 in FIG. 2 is divided into two buses (a bus 1 and a bus 15), thus obtaining a state estimation result with a large deviation from a true value. With the method of the present disclosure, after the three-phase state estimation is performed in the substation, both the analog bad data and the topology errors may be simultaneously and effectively detected, identified and removed from the substation, a correct state of the CB 3 is closed, the correct CB state and the CB island information are sent to the control center, and the control center performs topology analysis for the whole grid to find that there are still 14 buses in the whole grid, thus obtaining a reliable whole-grid state estimation result.

Table 2 shows comparison of voltage estimation results of two estimation methods under this circumstance. It may be seen from Table 2 that when there are both analog bad data and topology error on the CB, with the conventional state estimation method, analog bad data and topology errors may not be identified simultaneously, and a wrong number of the bus may be obtained by the topology analysis. Using the method of the present disclosure, these two bad data may be identified simultaneously in a substation level state estimation, a correct topology is sent to the control center, and correct topological structure and voltage of the whole grid are obtained by a control center level state estimation.

TABLE 2

Voltage Estimation Results in Control Center When There Are Both Analog Bad Data And CB State Bad Data

| | True Value | | Two-level State Estimation Value | | Measurement Estimation Error | | Conventional State Estimation Value | | Measurement Estimation Error | |
|---|---|---|---|---|---|---|---|---|---|---|
| Bus | V (p.u.) | Ang (rad) | V (p.u.) | Ang (rad) | V (p.u.) | Ang (rad) | V (p.u.) | Ang (rad) | V (p.u) | Ang (rad) |
| 1 | 1.06 | 0 | 1.063 | 0.000 | 0.00339 | 0.00000 | 1.065 | 0.000 | 0.00536 | 0.00000 |
| 2 | 1.045 | −0.087 | 1.048 | −0.086 | 0.00343 | 0.00071 | 1.051 | −0.086 | 0.00562 | 0.00137 |
| 3 | 1.01 | −0.222 | 1.013 | −0.220 | 0.00270 | 0.00170 | 1.014 | −0.220 | 0.00358 | 0.00231 |
| 4 | 1.019 | −0.18 | 1.022 | −0.178 | 0.00331 | 0.00153 | 1.022 | −0.178 | 0.00327 | 0.00231 |
| 5 | 1.02 | −0.153 | 1.024 | −0.152 | 0.00374 | 0.00141 | 1.023 | −0.151 | 0.00331 | 0.00212 |
| 6 | 1.07 | −0.248 | 1.075 | −0.246 | 0.00497 | 0.00196 | 1.075 | −0.245 | 0.00487 | 0.00279 |
| 7 | 1.062 | −0.233 | 1.066 | −0.230 | 0.00444 | 0.00265 | 1.065 | −0.230 | 0.00286 | 0.00338 |
| 8 | 1.09 | −0.233 | 1.095 | −0.230 | 0.00466 | 0.00338 | 1.094 | −0.229 | 0.00412 | 0.00415 |
| 9 | 1.056 | −0.261 | 1.061 | −0.258 | 0.00507 | 0.00331 | 1.060 | −0.257 | 0.00437 | 0.00407 |
| 10 | 1.051 | −0.264 | 1.056 | −0.261 | 0.00536 | 0.00350 | 1.056 | −0.260 | 0.00484 | 0.00424 |
| 11 | 1.057 | −0.258 | 1.063 | −0.256 | 0.00564 | 0.00237 | 1.062 | −0.255 | 0.00538 | 0.00315 |
| 12 | 1.055 | −0.263 | 1.060 | −0.262 | 0.00510 | 0.00066 | 1.060 | −0.262 | 0.00511 | 0.00149 |
| 13 | 1.05 | −0.265 | 1.056 | −0.263 | 0.00564 | 0.00247 | 1.056 | −0.262 | 0.00559 | 0.00329 |
| 14 | 1.036 | −0.28 | 1.039 | −0.276 | 0.00274 | 0.00407 | 1.038 | −0.275 | 0.00250 | 0.00478 |
| 15 | 1 | −0.153 | — | — | — | — | 0.704 | −0.814 | −0.29593 | −0.66135 |

3) Non-Three-Phase Operating Condition

It is assumed that the line T1, i.e., the A phase of the branch 1-5, is disconnected, the line is in a non-three-phase steady operating condition, thus causing a three-phase unbalance of a load L12 on the bus 5. However, a CB state measurement of the A phase on the line T1 is closed, i.e., bad data. In the conventional estimation method, the control center may only collect a total three-phase analog and digital measurement, but may not monitor the three-phase unbalance of the grid. Because a new stable state of the whole grid is achieved in the non-three-phase operating condition, compared with three-phase operating condition, a total three-phase power flow distribution changes. However, due to a presence of CB state bad data, the control center may not detect that the grid is in the non-three-phase steady operating condition. However, in the two-level state estimation method, measurement data of three phases may be collected in the substation to obtain estimation results of the three phases respectively. When the three-phase current unbalance degree of the outlet node is larger than a current unbalance degree threshold, alarming information is sent to the control center, so that it is convenient for operators to monitor the whole grid state and repair a malfunction. Table 3 shows local power estimation results and an operating condition when using the conventional state estimation method and a power estimation result of each outlet node in the substation when using the two-level state estimation method. It may be seen from table 3 that, the power estimation results of the conventional state estimation may not reflect that the grid is being in the non-three-phase operating condition. When the two-level state estimation method is used, it may be seen by the substation level state estimation that, unbalance degrees of power state estimation results between three phases of an outlet node 2 (a branch 1-5) and an outlet node 5 (a load L12) in FIG. 3 are large. Three-phase complex current estimation results and three-phase current unbalance degrees of outlet nodes in the substation are shown in Table 5. It may be seen from Table 5 that, three-phase current unbalance degrees of the node 2 and the node 5 are large, that is, three-phase current unbalance degrees of the line T1 and the load L12 are large, indicating that non-three-phase operation condition may occur which is actually the case, and the alarming information needs to be sent to the control center.

TABLE 3

Local Power Estimation Results And Operation State When Using The Conventional State Estimation Method And Transformer Substation Level Power Estimation Results When Using The Two-Level State Estimation Method (p.u.)

| | Conventional State Estimation Result | | | | Two-Level State Estimation Transformer Substation Level Power Estimation Result | | | | | | |
|---|---|---|---|---|---|---|---|---|---|---|
| Whole Grid No | pij | qij | Operation State | | Transformer Substation Node No | pij | qij | pij | qij | pij | qij |
| Branch 5~6 | 0.442 | 0.126 | Whole-phase Operation | | 4 | −0.447 | −0.131 | −0.438 | −0.122 | −0.429 | −0.124 |
| Branch 1~5 | 0.755 | 0.037 | Whole-phase Operation | | 2 | 0.001 | −0.006 | 1.099 | −0.043 | 1.086 | −0.034 |
| Branch 2~5 | 0.412 | 0.009 | Whole-phase Operation | | 3 | 0.412 | 0.015 | 0.402 | 0.016 | 0.392 | 0.002 |
| Branch 4~5 | −0.616 | 0.162 | Whole-phase Operation | | 6 | −0.613 | 0.159 | −0.625 | 0.155 | −0.615 | 0.154 |
| Load L12 | −0.073 | −0.014 | Whole-phase Operation | | 5 | 0.648 | −0.038 | −0.438 | −0.007 | −0.434 | −0.003 |

TABLE 4

Estimation Result and Three-phase Unbalance Degree of injection currents at Nodes in substation (p.u.)

| Node No | A Phase Current | | B Phase Current | | C Phase Current | | Three-phase Current unbalance |
|---|---|---|---|---|---|---|---|
| | Real Part | Imaginary Part | Real Part | Imaginary Part | Real Part | Imaginary Part | Degree (%) |
| 1 | 0 | −0.0001 | 0 | 0 | 0.0001 | 0 | 2.679 |
| 2 | 0 | 0 | 0.6 | −1.36 | 0.61 | 2.45 | 66.702 |
| 3 | 0.34 | 0.45 | 0.16 | −1.74 | 0.16 | 2.46 | 27.957 |
| 4 | 0.22 | −2.2 | 0.23 | 1.95 | 0.24 | −0.12 | 2.055 |
| 5 | 0.2 | 2.58 | 0.3 | 1.38 | 0.42 | −1.3 | 47.325 |
| 6 | 0.08 | −1.69 | 0.25 | 1.85 | 0.25 | −0.25 | 34.312 |

Although explanatory embodiments have been shown and described, it would be appreciated by those skilled in the art that changes, alternatives, and modifications all falling into the scope of the claims and their equivalents may be made in the embodiments without departing from spirit and principles of the disclosure.

What is claimed is:

1. A method of substation-control center two-level distributed nonlinear state estimation for power system, comprising steps of A) collecting a remote terminal unit (RTU) measurement data and a phasor measurement unit (PMU) measurement data at each voltage level in each substation by the control center, wherein the RTU measurement data comprises each three-phase voltage amplitude, each three-phase current amplitude, each three-phase active power and each three-phase reactive power in the substation and a state of each phase of each circuit breaker (CB) in the substation, and the PMU measurement data comprises each three-phase complex voltage, each three-phase complex current, each three-phase active power and each three-phase reactive power in the substation;

B) performing a first three-phase state estimation according to the RTU measurement data and the PMU measurement data to obtain a first estimation result, and removing bad data from the RTU measurement data and the PMU measurement data according to the first estimation result to estimate a state of the CB by each substation;

C) forming a new CB island at each voltage level according to the estimated state of the CB, and performing a second three-phase state estimation for the new CB island to obtain a final estimation result by each substation, in which the new CB island is a bus;

D) processing the final estimation result to obtain ripe data by each substation; and E) collecting the ripe data, a part of the RTU measurement data and a part of the PMU measurement data and performing a whole grid state estimation according to the ripe data, a part of the RTU measurement data and a part of the PMU measurement data by the control center.

2. The method according to claim 1, wherein the final estimation result comprises:

a three-phase CB state, a three-phase active power and a three-phase reactive power of each CB in the new CB island at each voltage level; and a three-phase complex voltage, a three-phase injection active power and a three-phase injection reactive power of each node in the new CB island at each voltage level.

3. The method according to claim 2, wherein the ripe data comprise: a three-phase voltage unbalance degree of each bus in the substation, a three-phase current unbalance degree of each outlet node, a total three-phase injection active power and a total three-phase injection reactive power of each outlet node, a total three-phase state of each CB, a line voltage or a positive sequence voltage of each bus, and a single-phase current or a positive sequence current of each outlet node.

4. The method according to claim 3, wherein the line voltage and the positive sequence voltage of each bus and the three-phase voltage unbalance degree of each bus in the substation are obtained through steps of:

obtaining a three-phase complex voltage of each bus in each new CB island in the substation according to the three-phase complex voltage measurement of each node by a following formula:

$$\dot{U}_{BSm}^{\varphi} = \frac{\sum_{i=1}^{n} \dot{U}_{nd,i}^{\varphi}}{n}$$

in which $\dot{U}_{nd,i}^{\varphi}$ is a three-phase complex voltage measurement of an $i^{th}$ node, $\varphi=a,b,c$ represents three phases, $\dot{U}_{BSm}^{\varphi}$ is a three-phase complex voltage of a bus of a $m^{th}$ new CB island, and n is a number of the bus;

obtaining the line voltage of each bus according to the three-phase complex voltage of each bus by following formulae:

$$\begin{cases} \dot{U}_{BSm}^{ab} = \dot{U}_{BSm}^{a} - \dot{U}_{BSm}^{b} \\ \dot{U}_{BSm}^{ac} = \dot{U}_{BSm}^{a} - \dot{U}_{BSm}^{c} \\ \dot{U}_{BSm}^{bc} = \dot{U}_{BSm}^{b} - \dot{U}_{BSm}^{c} \end{cases}$$

in which $\dot{U}_{BSm}^{ab}$ is an a-b line voltage of a $m^{th}$ bus, $\dot{U}_{BSm}^{ac}$ is an a-c line voltage of the $m^{th}$ bus, and $\dot{U}_{BSm}^{bc}$ is a b-c line voltage of the $m^{th}$ bus;

obtaining the positive sequence voltage and a negative sequence voltage of each bus according to the three-phase complex voltage of each bus by following formulae:

$$\begin{cases} \dot{U}_{BSm}^{(1)} = \frac{1}{3}\left(\dot{U}_{BSm}^{a} + \alpha \dot{U}_{BSm}^{b} + \alpha^2 \dot{U}_{BSm}^{c}\right) \\ \dot{U}_{BSm}^{(2)} = \frac{1}{3}\left(\dot{U}_{BSm}^{a} + \alpha^2 \dot{U}_{BSm}^{b} + \alpha \dot{U}_{BSm}^{c}\right) \end{cases}$$

in which $$\alpha = e^{j\frac{2}{3}\pi} = -\frac{1}{2} + j\frac{\sqrt{3}}{2},$$

$\dot{U}_{BSm}^{(1)}$ is a positive sequence voltage of the $m^{th}$ bus and $\dot{U}_{BSm}^{(2)}$ is a negative sequence voltage of the $m^{th}$ bus; and obtaining the three-phase voltage unbalance degree of each bus in the substation according to the positive sequence voltage and the negative sequence voltage of each bus by following formulae:

$$\varepsilon_{U_{BSm}} = \frac{|U_{Bsm}^{(2)}|}{|U_{Bsm}^{(1)}|} \times 100\%$$

$$\begin{cases} |U_{Bsm}^{(1)}| = \sqrt{(U_{Bsm,real}^{(1)})^2 + (U_{Bsm,imag}^{(1)})^2} \\ |U_{Bsm}^{(2)}| = \sqrt{(U_{Bsm,real}^{(2)})^2 + (U_{Bsm,imag}^{(2)})^2} \end{cases}$$

in which $U_{Bsm,real}^{(1)}$ and $U_{Bsm,imag}^{(1)}$ are a real part and an imaginary part of the positive sequence voltage $\dot{U}_{BSm}^{(1)}$ of the $m^{th}$ bus respectively, $U_{Bsm,real}^{(2)}$ and $U_{Bsm,imag}^{(2)}$ are a real part and an imaginary part of the negative sequence voltage $\dot{U}_{BSm}^{(2)}$ of the $m^{th}$ bus respectively, $|U_{BSm}^{(1)}|$ and $|U_{BSm}^{(2)}|$ are amplitudes of the positive sequence voltage and the negative sequence voltage of the $m^{th}$ bus respectively, and $\varepsilon_{U_{BSm}}$ is a three-phase voltage unbalance degree of the $m^{th}$ bus.

5. The method according to claim 3, wherein the positive sequence current, the single phase current and the three-phase current unbalance degree of each outlet node are obtained through steps of:

obtaining the three-phase injection complex current of each outlet node in each new CB island according to the three-phase complex voltage of each new CB island and the three-phase injection active power and the reactive power of each outlet node by a following formula:

$$\dot{I}_{LN,m_j}^{\varphi} = \left( \frac{P_{LN,m_j}^{\varphi} + jQ_{LN,m_j}^{\varphi}}{\dot{U}_{BSm}^{\varphi}} \right)^*$$

in which $P_{LN,m_j}^{\varphi}$ is a three-phase injection active power of a $j^{th}$ outlet node in a $m^{th}$ new CB island, $Q_{LN,m_j}^{\varphi}$ is a three-phase injection reactive power of the $j^{th}$ outlet node in the $m^{th}$ new CB island, $\dot{I}_{LN,m_j}^{\varphi}$ is a three-phase complex current of the $j^{th}$ outlet node in the $m^{th}$ new CB island, and $\varphi=a,b,c$ represents three phases;

obtaining the positive sequence current and a negative sequence current of each outlet node according to the three-phase complex current of each outlet node by following formulae:

$$\begin{cases} \dot{I}_{LN,m_j}^{(1)} = \frac{1}{3}(\dot{I}_{LN,m_j}^{a} + \alpha \dot{I}_{LN,m_j}^{b} + \alpha^2 \dot{I}_{LN,m_j}^{c}) \\ \dot{I}_{LN,m_j}^{(2)} = \frac{1}{3}(\dot{I}_{LN,m_j}^{a} + \alpha^2 \dot{I}_{LN,m_j}^{b} + \alpha \dot{I}_{LN,m_j}^{c}) \end{cases}$$

in which $$\alpha = e^{j\frac{2}{3}\pi} = -\frac{1}{2} + j\frac{\sqrt{3}}{2},$$

$\dot{I}_{LN,m_j}^{(1)}$ is a positive sequence current of a $j^{th}$ outlet node of a $m^{th}$ bus, and $\dot{I}_{LN,m_j}^{(2)}$ is a negative sequence current of the $j^{th}$ outlet node of the $m^{th}$ bus; and obtaining the three-phase current unbalance degree of each outlet node in the substation according to the positive sequence current and the negative sequence current of each outlet node by following formulae:

$$\varepsilon_{I_{LN,m_j}} = \frac{|I_{LN,m_j}^{(2)}|}{\|I_{LN,m_j}^{(2)}\|} \times 100\%$$

$$\begin{cases} |I_{LN,m_j}^{(1)}| = \sqrt{(I_{LN,m_j,real}^{(1)})^2 + (I_{LN,m_j,imag}^{(1)})^2} \\ |U_{LN,m_j}^{(2)}| = \sqrt{(I_{LN,m_j,real}^{(2)})^2 + (I_{LN,m_j,imag}^{(2)})^2} \end{cases}$$

in which $I_{LN,m_j,real}^{(1)}$ and $I_{LN,m_j,imag}^{(1)}$ are a real part and an imaginary part of the positive sequence current of the $j^{th}$ outlet node in the $m^{th}$ new CB island respectively, $I_{LN,m_j,real}^{(2)}$ and $I_{LN,m_j,imag}^{(2)}$ are a real part and an imaginary part of the negative sequence current of the $j^{th}$ outlet node in the $m^{th}$ new CB island respectively, $|I_{LN,m_j}^{(1)}|$ and $|I_{LN,m_j}^{(2)}|$ are amplitudes of the positive sequence current and the negative sequence current of the $j^{th}$ outlet node in the $m^{th}$ new CB island respectively, and $$\varepsilon_{I_{LN,m_j}}$$

is a three-phase current unbalance degree of the $j^{th}$ outlet node in the $m^{th}$ new CB island.

6. The method according to claim 3, wherein the total three-phase state of each CB in the substation is obtained according to the three-phase state of each CB by a following formula:

$$S_{CB,i}^3 = \begin{cases} 0, \text{ if } S_{CB,i}^a = S_{CB,i}^b = S_{CB,i}^c = 0; \\ 1, \text{ if } S_{CB,i}^a = S_{CB,i}^b = S_{CB,i}^c = 1; \\ 2, \text{ not conform} \end{cases}$$

in which $S_{CB,i}^{\varphi}$ is a three-phase state of an $i^{th}$ CB, $\varphi=a,b,c$ represents three phases, and $S_{CB,i}^3$ is a total three-phase state of the $i^{th}$ CB.

7. The method according to claim 3, wherein the total three-phase injection active power and the total three-phase injection reactive power of each outlet node in the substation are obtained according to the three-phase injection active power and the three-phase injection reactive power of each outlet node by following formulae:

$$\begin{cases} P_{LN,j}^3 = P_{LN,j}^a + P_{LN,j}^b + P_{LN,j}^c \\ Q_{LN,j}^3 = Q_{LN,j}^a + Q_{LN,j}^b + Q_{LN,j}^c, \end{cases}$$

in which $P_{LN,j}^{\varphi}$ is a three-phase injection active power of a $j^{th}$ outlet node, $Q_{LN,j}^{\varphi}$ is a three-phase injection reactive power of the $j^{th}$ outlet node, $\varphi=a,b,c$ represents three phases $P_{LN,j}^3$ is a total three-phase injection active power of the $j^{th}$ outlet node, and $Q_{LN,j}{}^3$ is a total three-phase injection reactive power of the $j^{th}$ outlet node.

8. The method according to claim 1, wherein the step E) further comprises:
   for the substations performing the substation three-phase state estimation, the control center collecting the ripe data of each substation; and
   for the substations not performing the substation three-phase state estimation, the control center collecting a part of the RTU measurement data and a part of the PMU measurement data.

9. The method according to claim 8, wherein the part of the RTU measurement data comprises a line voltage or a positive sequence voltage of each electric bus, a line current or a positive sequence current of each outlet node, a total three-phase active power of each outlet node, a total three-phase reactive power of each outlet node and a total three-phase state of each CB; and the part of the PMU measurement data comprises a line voltage or a positive sequence voltage of each electric bus, a single-phase current or a positive sequence current of each outlet node, a total three-phase active power of each outlet node and a total three-phase reactive power of each outlet node, in which the outlet node is connected with a transformer, an alternate line or a reactive compensator in the substation.

10. The method according to claim 1, wherein the step E) further comprises:
    when the total three-phase state of the CB is 2, alarming;
    when the three-phase current unbalance degree of each outlet node in the substation is larger than a predetermined current unbalance degree threshold, alarming; or
    when the three-phase voltage unbalance degree of each bus in the substation is larger than a predetermined voltage unbalance degree threshold, alarming.

11. The method according to claim 1, wherein a state estimation period of the control center is larger than that of the transformer substation.

* * * * *